(12) United States Patent
Sotiropoulos et al.

(10) Patent No.: US 9,906,379 B2
(45) Date of Patent: Feb. 27, 2018

(54) REDUNDANT CONTENT BRIDGING BETWEEN SUBSTATION COMMUNICATION NETWORKS

(71) Applicant: ABB TECHNOLOGY AG, Zurich (CH)

(72) Inventors: Ioannis Sotiropoulos, Baden (CH); Rida Jichi, Remigen (CH); Otmar Gorlitz, Fislisbach (CH); Thomas Werner, Spreitenbach (CH); Claudio Honegger, Wald (CH)

(73) Assignee: ABB Schweiz AG, Baden (CH)

( * ) Notice: Subject to any disclaimer, the term of this patent is extended or adjusted under 35 U.S.C. 154(b) by 124 days.

(21) Appl. No.: 14/814,861

(22) Filed: Jul. 31, 2015

(65) Prior Publication Data

US 2016/0056974 A1 Feb. 25, 2016

(30) Foreign Application Priority Data

Aug. 19, 2014 (EP) .................................... 14181418

(51) Int. Cl.
*H04L 12/46* (2006.01)
*H04L 29/12* (2006.01)
*H04L 12/40* (2006.01)

(52) U.S. Cl.
CPC .......... *H04L 12/4637* (2013.01); *H04L 12/40* (2013.01); *H04L 12/4625* (2013.01); *H04L 61/2038* (2013.01); *H04L 61/6022* (2013.01)

(58) Field of Classification Search
None
See application file for complete search history.

(56) References Cited

U.S. PATENT DOCUMENTS

| 9,256,247 B2* | 2/2016 | Banerjea ............... H04J 3/0664 |
| 9,432,250 B2* | 8/2016 | Ma ............................ H04L 1/22 |
| 2005/0281194 A1* | 12/2005 | Sonoda .................. H04L 45/586 370/220 |
| 2006/0092856 A1* | 5/2006 | Mitsumori ................ H04L 1/22 370/254 |
| 2006/0109802 A1* | 5/2006 | Zelig ....................... H04L 12/42 370/258 |

(Continued)

OTHER PUBLICATIONS

European Search Report dated Feb. 19, 2015 for Application No. 14181418.6.

(Continued)

*Primary Examiner* — Bunjob Jaroenchonwanit
(74) *Attorney, Agent, or Firm* — Taft Stettinius & Hollister LLP (57) ABSTRACT

A method is disclosed for providing a network bridge between a source and a receiving network of a communication network, wherein the network bridge includes two content-bridging nodes connected between the source and the receiving networks according to a redundancy schema defined in IEC62439-3. The method can include assigning a common source network node identifier to the two content-bridging nodes; receiving, by each of the two content-bridging nodes, network traffic within the source network; and forwarding, by each of the two content-bridging nodes using the source network identifier, the network traffic from the source to the receiving networks.

15 Claims, 5 Drawing Sheets

(56) References Cited

U.S. PATENT DOCUMENTS

| | | | | |
|---|---|---|---|---|
| 2006/0291378 | A1* | 12/2006 | Brotherston | H04L 12/2854 370/221 |
| 2007/0058795 | A1* | 3/2007 | Arrant | H04M 3/56 379/202.01 |
| 2007/0283181 | A1* | 12/2007 | Shelton | G06F 13/4045 713/400 |
| 2008/0071961 | A1* | 3/2008 | Higuchi | G06F 11/2017 710/312 |
| 2008/0101218 | A1* | 5/2008 | Lei | H04L 12/2898 370/219 |
| 2009/0073994 | A1* | 3/2009 | Qureshi | H04L 29/12792 370/401 |
| 2009/0168671 | A1* | 7/2009 | Holness | H04L 12/42 370/256 |
| 2009/0172143 | A1* | 7/2009 | Ishimoto | H04L 12/2424 709/223 |
| 2010/0177752 | A1* | 7/2010 | Aggarwal | H04L 45/50 370/338 |
| 2010/0189117 | A1* | 7/2010 | Gowda | |
| 2011/0116508 | A1* | 5/2011 | Kirrmann | H04L 12/437 370/392 |
| 2012/0020358 | A1* | 1/2012 | Bare | H04L 12/18 370/392 |
| 2012/0163256 | A1* | 6/2012 | Kang | H04L 12/4625 370/310 |
| 2014/0023074 | A1* | 1/2014 | Mishra | H04L 12/4641 370/390 |
| 2014/0092727 | A1* | 4/2014 | Robinson | H04L 12/4633 370/221 |
| 2014/0204730 | A1* | 7/2014 | Sampath | H04L 41/0668 370/220 |
| 2015/0023352 | A1* | 1/2015 | Yang | H04L 12/462 370/392 |
| 2015/0026384 | A1* | 1/2015 | Maitra | G06F 13/4022 710/313 |
| 2015/0052284 | A1* | 2/2015 | Maitra | G06F 13/4022 710/314 |
| 2015/0172172 | A1* | 6/2015 | DeCusatis | H04L 12/44 370/219 |
| 2015/0331762 | A1* | 11/2015 | Wollbrand | H04L 61/103 714/4.11 |
| 2015/0365316 | A1* | 12/2015 | Liao | H04L 45/66 709/223 |
| 2016/0100056 | A1* | 4/2016 | Kamboh | H04W 4/22 379/45 |
| 2016/0261688 | A1* | 9/2016 | Anand | H04L 67/1029 |
| 2016/0269263 | A1* | 9/2016 | Gautreau | H04L 45/245 |
| 2016/0344689 | A1* | 11/2016 | Grevers, Jr. | H04L 61/103 |
| 2016/0370204 | A1* | 12/2016 | Spanier | G01D 4/002 |

OTHER PUBLICATIONS

IEC ED-IEC: "Part 3: Parallel Redundancy Protocol (PRP) and High-Availability Seamless Redundancy (HSR)", Internet Citation, Dec. 31, 2010, pp. 1-62, XP-002680227.

* cited by examiner

REDUNDANT CONTENT BRIDGING BETWEEN SUBSTATION COMMUNICATION NETWORKS

RELATED APPLICATION

This application claims priority under 35 U.S.C. § 119 to European Patent Application No. 14181418.6 filed in Europe on Aug. 19, 2014, the entire content of which is hereby incorporated by reference in its entirety.

FIELD

The present disclosure relates to the field of communication within a substation communication network of a power network, such as a redundant content bridging between a source network and a receiving network in the substation communication network.

BACKGROUND INFORMATION

Communication networks in digital substation automation systems have been divided into several layers of networks, i.e. so-called buses. Each layer may carry different types of traffic, pertinent to the functions of the devices connected to this layer. Part of the network traffic can be considered horizontal; i.e., the information carried is only relevant for recipients on this network layer, not on other layers. In general it is desirable, e.g. for performance reasons, to contain such horizontal traffic within the network layer and not forward it to other network layers. However, an increasing amount of traffic is vertical; i.e., it needs to be forwarded to lower or higher network layers. Depending on the type and content of the traffic it may be necessary to forward it as is, filter and forward only parts of a data stream, or aggregate selected content to a new data stream which is then forwarded.

Substation communication networks are often required to implement redundancy schemes according to IEC 62439-3 such as PRP or HSR in order to increase the availability of the communication system. Consequently, the bridging connections between network layers should be redundant too. This poses a technical issue for blocking, filtering and aggregating traffic between network layers, because the redundant bridging connections should operate in tight coordination in order to obey the rules of the redundancy scheme. As a result, the standard behaviour of existing solutions such as redundant quad-boxes is to just forward all traffic between networks layers; filtering and aggregation is not supported.

Nowadays, redundant bridges and gateways are known for communication systems. The redundant bridges are variations of quad-boxes. Their main feature is the redundant forwarding of traffic between network layers that themselves implement a redundancy scheme. A frame is duplicated for forwarding at the sending network and the receiving network discards one of the duplicated frames that arrived later. The quad-boxes can achieve traffic filtering if they support VLANs. However, aggregation of data at the network bridge is not possible. The topology of the source network is not hidden; i.e., quad-boxes "project" one network layer into the other.

The gateways, on the other hand, have the function to filter and potentially translate data between networks or network layers, but do not provide redundancy and consequently do not have zero recovery time in case of failure. The gateways can also introduce a considerable latency when bridging networks.

SUMMARY

A method is disclosed for providing a network bridge between a source network and a receiving network of a communication network, wherein the network bridge includes two content-bridging nodes connected between the source and the receiving networks according to a redundancy schema defined in IEC 62439-3, wherein the method comprises: assigning a common source network node identifier to the two content-bridging nodes; receiving, by each of the two content-bridging nodes, network traffic within the source network; and forwarding, by each of the two content-bridging nodes using the common source network node identifier, the network traffic from the source network to the receiving network.

A network bridge is also disclosed between a source network and a receiving network of a communication network, the network bridge comprising: two content-bridging nodes configured for connection between the source network and the receiving network according to a redundancy schema defined in IEC 62439-3; wherein the two content-bridging nodes have a common source network node identifier, each of the two content-bridging nodes being configured to forward network traffic from the source network to the receiving network using the common source network node identifier.

BRIEF DESCRIPTION OF THE DRAWINGS

The subject matter disclosed herein will be explained in more detail in the following text with reference to preferred exemplary embodiments which are illustrated in the attached drawings, in which.

The reference symbols used in the drawings, and their primary meanings, are listed in summary form in the list of designations. In principle, identical parts are provided with the same reference symbols in the figures.

DETAILED DESCRIPTION

A network bridge is disclosed that not only forwards traffic in a redundant manner but also enables functions such as filtering and aggregation of data in vertical communication between the different networks in the substation communication network.

Figure 5:
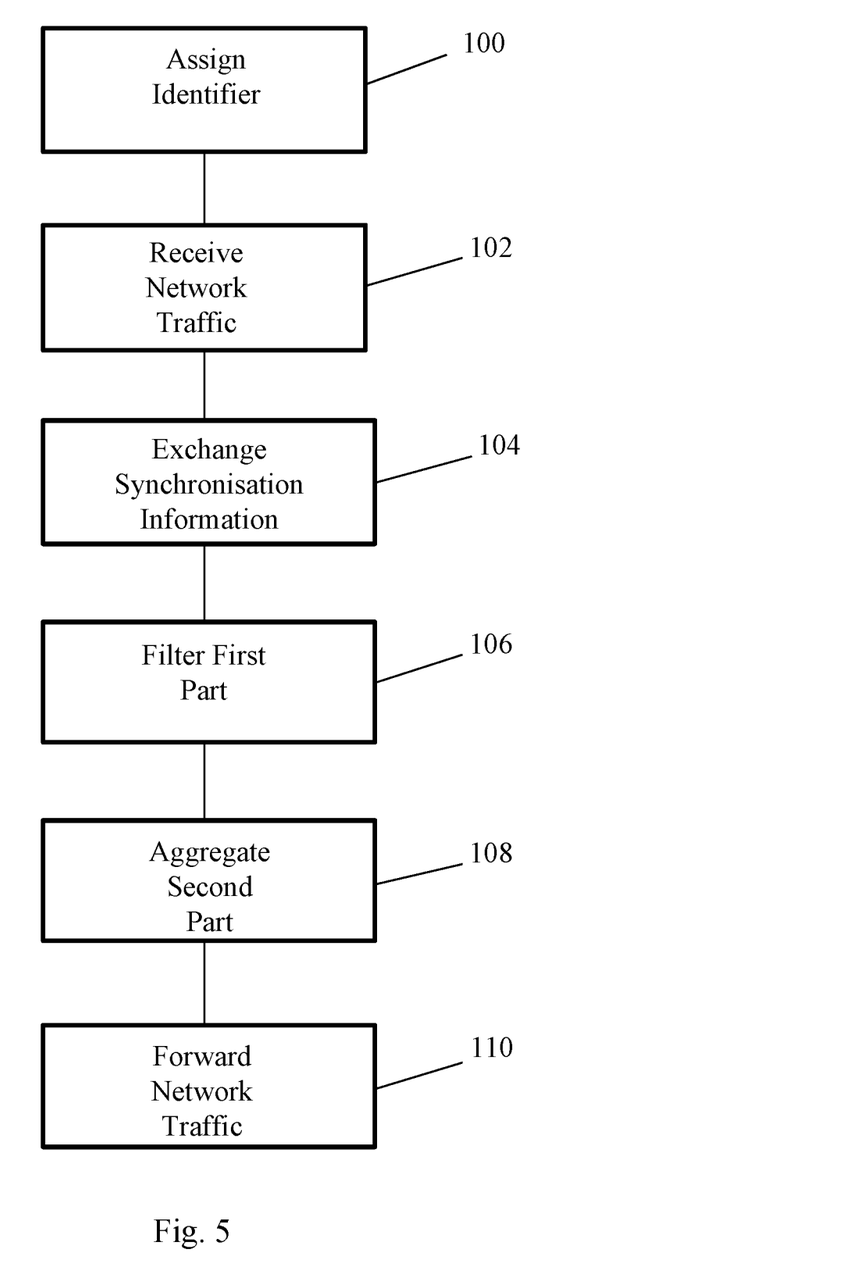
FIG. 5 shows a method for providing a network bridge between a source network and a receiving network of a communication network.

An exemplary method is disclosed for providing a redundant network bridge between a source and a receiving network in a Substation communication network, wherein the network bridge includes two content-bridging nodes connected between the source and the receiving networks according to a redundancy schema defined in the standard IEC62439-3. The exemplary method as shown in FIG. 5 includes: assigning a common source network node identifier to the two content-bridging nodes (100); receiving, by each of the two content-bridging nodes, network traffic within the source network (102); and forwarding, by each of the two content-bridging nodes using the common source network node identifier, the network traffic from the source to the receiving networks (110).

According to a further aspect, an exemplary network bridge between a source network and a receiving network in a Substation communication network is disclosed which includes: two content-bridging nodes connected between the source and the receiving network according to a redundancy schema defined in the standard IEC62439-3, wherein the two content-bridging nodes have a common source network node identifier, and each of the two content-bridging nodes is configured to forward network traffic from the source to the receiving network using the common source network node identifier.

The source and receiving networks may be in different network layers; e.g., process and station buses in a substation communication network, each providing a different functionality or carrying different data of the substation communication. For instance, a source network can carry process data such as sampled values SV messages and GOOSE messages including status information, while the receiving network can contain control data or control commands such as MMS. It is also possible to use a network bridge according to the present disclosure in source and receiving networks providing the same functionality.

Because the two connect-bridging nodes use the same source network node identifier, within the receiving network these two nodes appear as one logical node that actually represents the whole source network. The source network node identifier can be in the form of the MAC address in the substation communication network.

The network bridge may receive and forward the traffic in both directions; i.e., it may also forward network traffic from the receiving network to the source network. In case neither aggregation, nor filtering, nor representing the receiving network towards the source network is necessary, the network bridge according to the present disclosure can appear as two network content-bridging nodes; i.e., all traffic from the receiving network towards the source network are just forwarded, and the source network sees all nodes in the receiving network. In case aggregation, filtering or representing the receiving network towards the source network is desired, the above described principle of using a common network identifier can be applied in this communication direction as well; i.e., the content-bridging nodes are assigned one common receiving network node identifier so that the network bridge with the receiving network nodes appear as one logical network, thereby hiding the receiving network relative to the source network. The common receiving network node identifier may be different than the common source network node identifier. The algorithm for filtering and aggregation is instantiated twice; i.e., one for either direction.

In an exemplary embodiment, there are more than one common source network identifier. These would be useful for the case where the two nodes represent within the receiving network more than one source network. In this case a first half of the content bridging nodes faced to the source network are divided in two parts, each with two communication links, these four new links connecting to a second source network ring. Likewise, the second half of the content bridging nodes faced to the receiving network could be divided in two, thus connecting the source networks to two independent receiving networks. The two content bridging nodes would connect then two source networks to two receiving networks.

In a further exemplary embodiment, two network bridges can also be implemented within the substation communication network. In this case a first network bridge is connected between a first source and a first receiving network, and a second network bridge is connected between a second source and a second receiving network. The two content bridging nodes of the first network bridge share a first common source network node identifier identifying the first source network, and the two content bridging nodes of the second network bridge share a second common source network node identifier identifying the second source network. In the first and second receiving networks, the two network bridges appear as two logical networks, representing the whole first and whole second source networks, respectively.

An exemplary method according to the present disclosure as shown in FIG. 5 can include: filtering a first part of the network traffic by the two content-bridge nodes, prior to forwarding (106); and aggregating a second part of the network traffic by the two content-bridge nodes, prior to forwarding (108).

An exemplary method according to the present disclosure as shown in FIG. 5 can include: exchanging synchronisation information in the source network by the two content-bridge nodes if the network traffic includes sporadic data (104).

The source network can, for example, be a PRP or a HSR ring, and the receiving network is a PRP or HSR protocol, and the network traffic is forwarded according to the protocol of the receiving network (e.g., PRP or HSR protocol) (110).

Exemplary embodiments allow bridging network layers in a digital communication system. The network layers may implement a redundancy scheme such as PRP or HSR. The bridging between networks layers is redundant; i.e., there are at least two communication channels between two network layers. The redundant network bridges hide the topology of the source network layer; i.e., towards the receiving network layer, the source appears as a single device connected to this network layer. The redundant network bridges allow blocking, filtering and aggregation of periodic and sporadic traffic. Blocking, filtering and aggregation may be integrated seamlessly into existing redundancy schemes. This can be achieved without any change to the existing network topologies and without additional requirements to other connected devices. Further, a low latency (e.g., <500 μs or even <50 μs), depending on the frame size of the forwarding/aggregated traffic, can be also achieved by exemplary embodiments as disclosed herein for bridging traffic between network layers.

According to exemplary embodiments, the redundant content bridging connects two network layers in a transparent and redundant manner. Transparent, because each network appears within the other as one logical network node. Redundant, because the connection includes (e.g., consists of) two physically independent communication paths. The connected networks themselves too may implement redundant communication schemes.

The content-bridging nodes forming the network layer connection generate data for the receiving network layer out of data from the source network layer. This generation of data can be any kind of set operation on the original data (e.g., filtering, aggregation, mapping, etc.), including, but not limited to identity mapping (e.g., simple forwarding of data with changed source identifier).

Within the receiving network the two content-bridging nodes have the same source identifier. Consequently, other nodes in the receiving network consider frames sent by either of the content-bridging nodes as originating from the same node. The redundancy principle in the receiving network that expects and automatically discards duplicated frames is obeyed and the content-bridging connection works without any change to the network topology or the behaviour of other network nodes.

Figure 1:
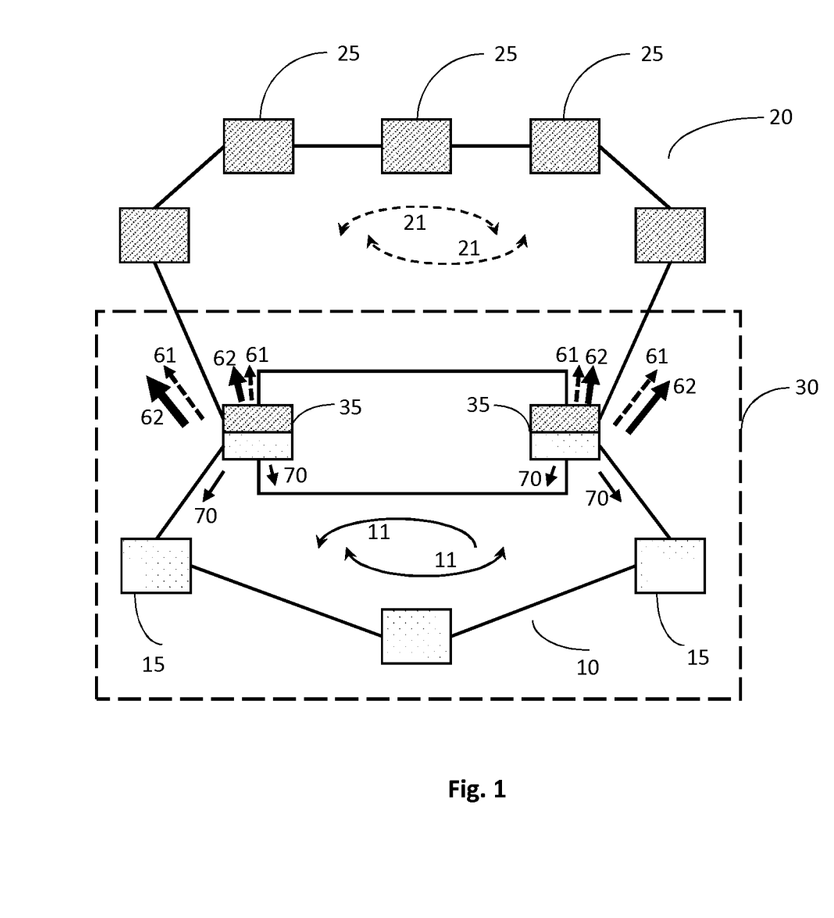
FIG. 1 schematically shows an exemplary redundant content bridging topology between source and receiving communication networks, according to the present disclosure.

FIG. 1 shows a basic connection principle of the redundant content bridges according to an exemplary embodiment. The operating principle is applicable in redundancy schemes according to IEC 62439-3 that are based on duplicated frames. In this topology the content-bridging network nodes connect two network layers, both implemented according to the HSR redundancy scheme.

The figure sketches the operation principle: both network layers carry traffic according to the HSR redundancy scheme. The content-bridging nodes are redundant too. A part of the source layer traffic is filtered and forwarded into the receiving layer. Another part of the source layer traffic is aggregated and forwarded into the receiving layer. All forwarded traffic is again redundant in the receiving network layer. In order to operate in tight co-operation the content-bridging nodes exchange synchronization information in the source network.

The aggregated and forwarded traffic originates at the content bridging nodes. The filtered and forwarded traffic is in a similar way processed by the content-bridging nodes such that it appears to the receiving network layer as originating from the content-bridging nodes too. As a result, in the receiving network layer, the source layer is hidden. All forwarded traffic appears as originating from the content-bridging nodes. Moreover, the content-bridging nodes use the same source identifier. Consequently, they appear as one logical device connected to the receiving network layer.

The traffic filtering and aggregation are configured identically at the content-bridging nodes. Since both nodes receive the same traffic within the source network layer, their filtering and aggregation produce the same result towards the receiving network layer. With the same source identifier at both content-bridging nodes, all forwarded traffic appears as duplicated frames within the receiving network layer, which obeys the redundancy scheme implemented by the network layer.

In order to synchronise their forwarding, and for example, to always send the same data with the same frame identifiers, the content-bridging nodes may exchange content synchronisation information. In order to convey a message from the content bridging nodes to a receiver it is important to synchronise the redundancy tags; e.g., HSR tag, PRP trailer, of the message. The receiving node will only check this tag/trailer and decide upon it whether to forward the frame to the receiver or to discard it. In general the content bridging may cope with two types of traffic: the periodic data, where the frames of the periodic data streams are created at well-defined intervals; frames are for example marked with a sequence number; and the sporadic data, where it is not known in advance if and when sporadic data is created. Potentially, sporadic data appears in bursts. For example, the periodic data may be in form of sampled values containing measurements from primary substation equipment, while the sporadic data may be in form of GOOSE messages containing substation equipment status information, emitted sporadically on change of status.

Figure 2:
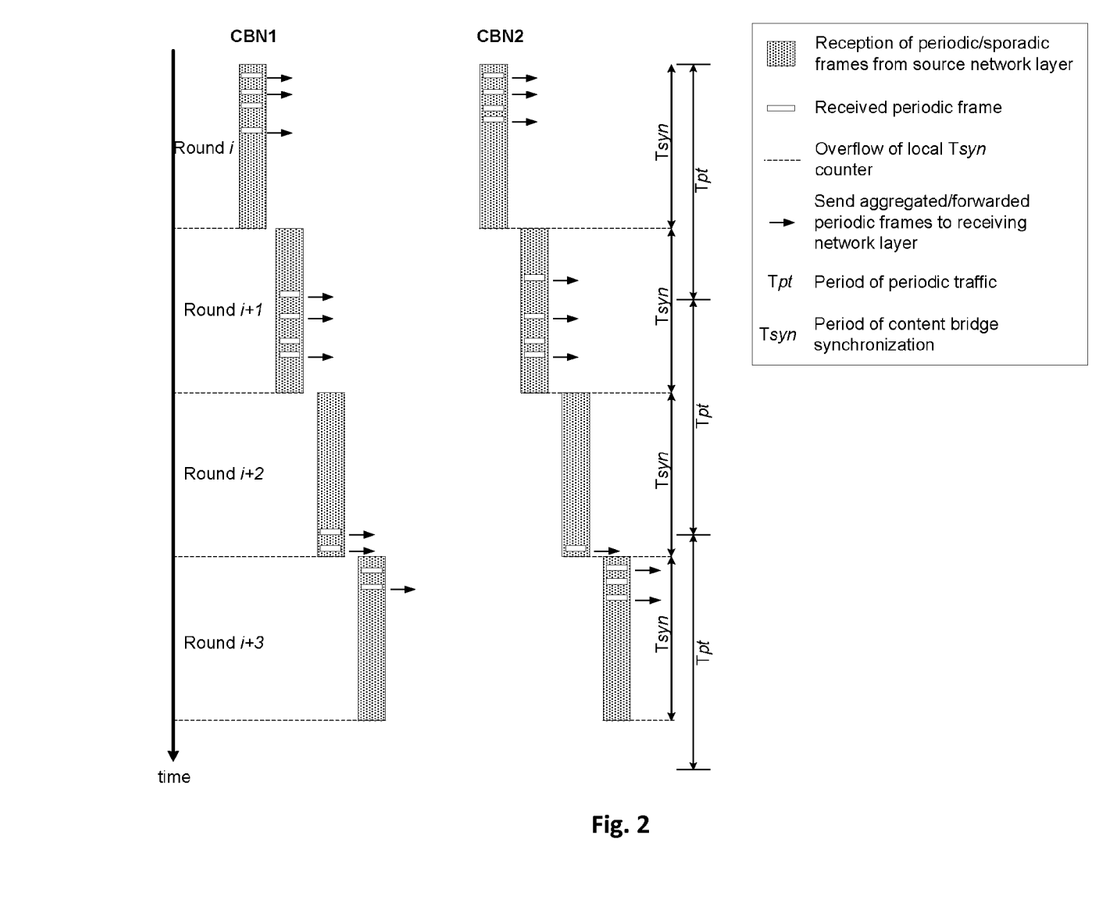
FIG. 2 schematically shows an operation principle with pure periodic traffic, according to an exemplary embodiment of the present disclosure.

FIG. 2 shows the exemplary operation of the two content-bridging nodes CBN1 and CBN2 with pure periodic traffic. Arrival of each frame is known in advance. Missing frames are easily detected due to the frame sequence number. Both nodes can process and forward synchronously without communication. In this case content-bridging is limited to periodic traffic only, the content-bridging nodes do not need to exchange synchronization information. If all frames arrive at the expected time (e.g., in normal operation case), the content-bridging nodes can synchronously process and forward the frames without any interaction. Since the arrival of all frames is known in advance, any missing frames can be easily detected. Due to the periodic nature of the traffic, sequence numbers of forwarded frames can be calculated in advance. Consequently, the missing frames will not disturb the assignment of sequence numbers. Hence even in case of missing frames, no synchronisation between the content-bridging nodes is necessary.

Figure 3:
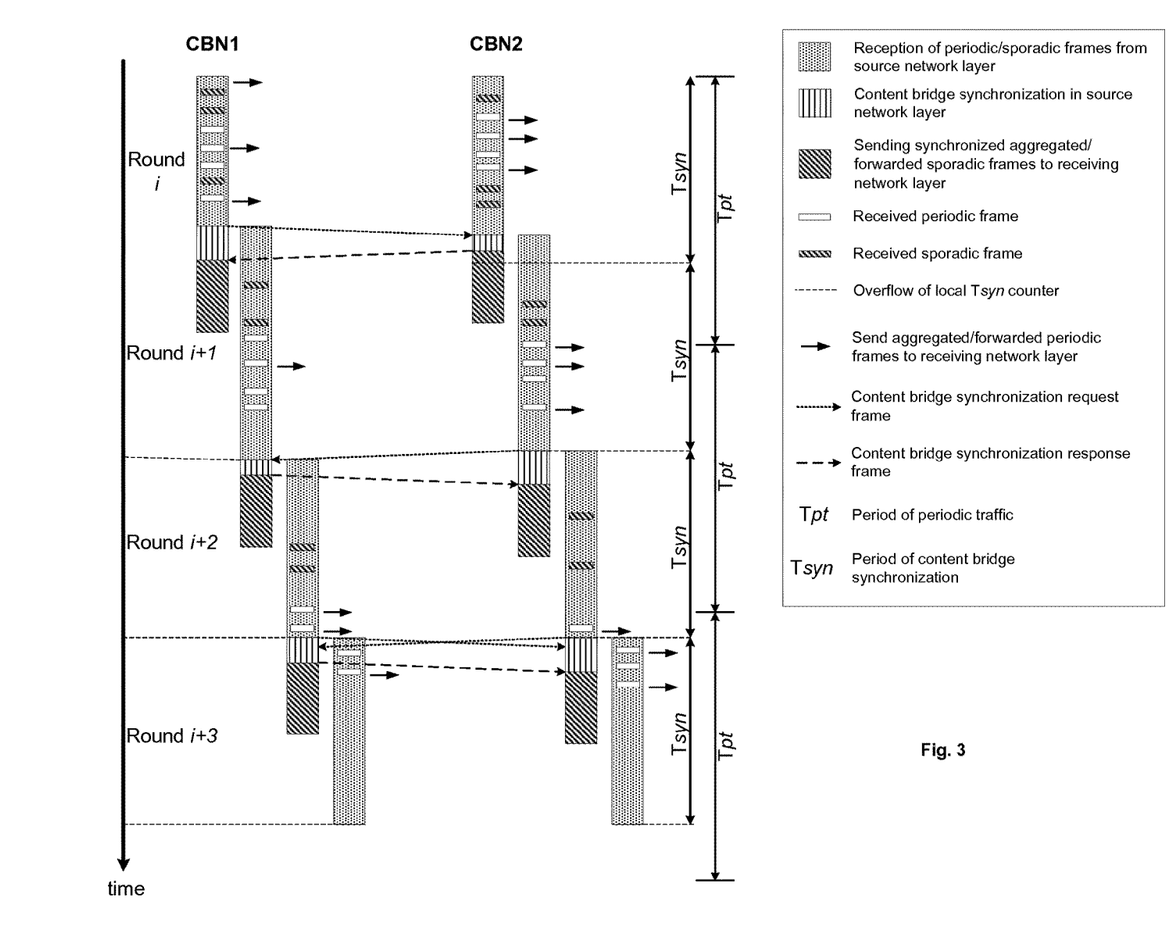
FIG. 3 schematically shows an operation principle with mixed periodic and sporadic traffic, according to an exemplary embodiment of the present disclosure.

FIG. 3 shows the operation in case of mixed periodic and sporadic traffic, where the content-bridging nodes exchange synchronisation information. In case of sporadic traffic, or mixed periodic and sporadic traffic, the content-bridging nodes should synchronise in order to create exact duplicates of forwarded frames. The redundancy scheme of the source network layer provides each content-bridging node with the same frames. However, the order of arrival may not be identical at both content-bridging nodes. Consequently, the nodes need to synchronise in order to create exact copies—in particular with respect to sequence numbers—for forwarding. Again, in error scenarios (e.g., frames missing at one content-bridging node), synchronisation between the nodes is necessary.

The synchronisation between the content-bridging nodes can be achieved in different ways (e.g., sending specific synchronization messages in form of request and response, or attaching necessary synchronization information to existing frames that are sent by both nodes). In a first method, synchronization request messages contain identifiers of received frames and proposed sequence numbers of forwarded frames. The response to synchronization request contains agreed sets or subsets of sequence numbers of forwarding frames.

The operation principle shows that the content-bridging nodes operate in sending rounds in order to accommodate for different arrival times of frames within the source network layer. In order to handle missing frames or lost synchronisation messages, sending rounds may be subject to time-outs. If the content-bridging nodes are time-synchronised their sending rounds are aligned, which can significantly decrease latency for forwarding and reduce time-out length.

Exemplary inventive principles as disclosed herein can be extended vertically and horizontally for connection of more than two network layers. In vertical extension, a hierarchy of more than two network layers is connected such that content-bridging nodes can bridge each two neighbouring network layers. This effectively forms a chain of connected network layers. In horizontal extension, multiple networks are connected into one receiving network. In the receiving network physically multiple pairs of content-bridging nodes appear as the bridges to the source networks. Effectively this connects the source networks by their content-bridging nodes to a common receiving network.

The principles disclosed herein are inherently bi-directional: for two network layers connected by content-bridging nodes each appears within the other as one logical network node. Likewise, data generation, (i.e., forwarding, filtering, aggregation, etc.), works in both ways. Hence the receiving network can be at the same time the source network and vice versa.

Hereinafter, several implementation examples or use cases are explained.

In the embodiment as shown in FIG. 1, the redundant content bridging connects two network layers that are source and receiving networks, in this case two HSR rings 10 and 20, in a transparent and redundant way. The connecting content-bridging nodes 35 appear for the HSR ring 20 as one logical device 30, hiding the complexity of the other network. The network connection is redundant due to two physically separate and independent content-bridging nodes 35. The content-bridging nodes 35 forming the network layer connection generate data for the receiving network layer 20 out of data from the source network layer 10. The generation of data can be any kind of set operation on the original data (e.g., filtering, aggregation, mapping, etc., including identity mapping, in which frames from the source network are forwarded to the receiving network 20 without changing the frame contents, but labelling the content-bridging nodes as source of the frames). The frames sent into the receiving network are conformant to the HSR protocol. The two content-bridging nodes 35 are time-synchronised. Consequently, their sending rounds, see FIG. 3, are time-aligned.

In a further exemplary embodiment, there is no time-synchronisation between content-bridging nodes necessary. In this embodiment the sending rounds of the content-bridging nodes are not time aligned. Each node locally aligns its sending round to the arrival of periodic traffic, or to the arrival of synchronisation messages of its peer content-bridging node.

In a further exemplary embodiment, there are only pure periodic traffic. In this embodiment content-bridging is limited to periodic traffic only. Each frame to be processed by the content-bridging nodes is marked with a sequence number. Consequently, the mapping of sequence number in the source network layer 10 to sequence number of the forwarded frame can be pre-calculated. This obsoletes all synchronisation messages between the content-bridging nodes 35.

Figure 4:
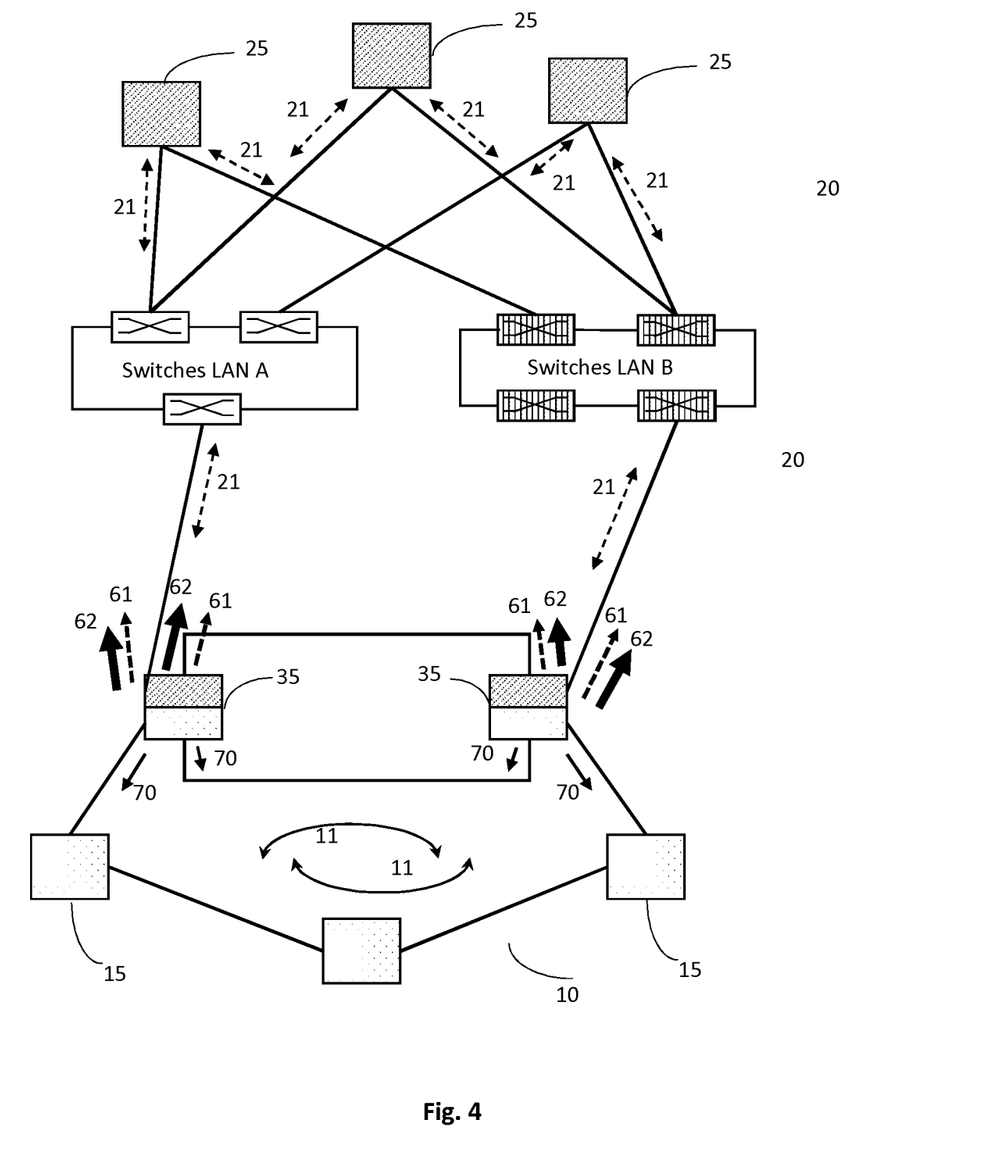
FIG. 4 schematically shows redundant content bridging between a HSR source network and a PRP receiving network, according to an exemplary embodiment of the present disclosure.

In a further exemplary embodiment as shown in FIG. 4, the content-bridging nodes 35 connect a HSR ring 10 with a PRP network 20. The operating principle remains the same and all features of the content bridging are retained. The forwarded frames are conformant to the PRP protocol. In order to allow separation of the network layers the PRP implementation on the content-bridging nodes may be deviated from standard PRP-HSR interconnection. An additional link between the content-bridging nodes may be provided for forwarding the received PRP traffic to the peer node.

In a further exemplary embodiment, a two-way content bridging is provided, where traffic filtering/aggregation and forwarding are configured in both directions. That means the two bridged network layers are source and recipient at the same time. At the content-bridging nodes the processing logic is instantiated twice and each instance applied in one direction. The bridged network layers may either be both HSR rings, or one HSR ring and one PRP scheme, or both PRP schemes.

The redundant content bridging according to the present disclosure makes selected information available across network layers. In contrast to known solutions, the bandwidth usage can be considerably decreased and forwarding latency may be kept minimal. This facilitates the implementation of functionality depending on the information on different layers in the substation automation hierarchy—closer to the process or higher up on more powerful computing platforms. Moreover, functionality can be concentrated or distributed more freely by reducing the constraint of data availability.

Exemplary embodiments as disclosed herein can transparently interconnect redundant networks and provide zero recovery time in case of network failure. Hiding the source network behind one logical node in the receiving network can significantly reduce configuration and engineering effort.

While embodiments of the invention have been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination which shall be considered disclosed herein.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS 10 source network
11 traffic within the source network
15 network node in the source network
20 receiving network
21 traffic within the receiving network
25 network node in the receiving network
30 logical device for the receiving network
35 content-bridging network node
61 filtered and forwarded traffic
62 aggregated and forwarded traffic
70 content bridge synchronisation message

The invention claimed is:

1. A method for providing a network bridge between a source network and a receiving network of a communication network, wherein the network bridge includes two content-bridging nodes connected between the source and the receiving networks according to a redundancy schema defined in IEC 62439-3, wherein the method comprises:
   assigning a common source network node identifier to the two content-bridging nodes;
   receiving, by each of the two content-bridging nodes, network traffic within the source network;

forwarding, by each of the two content-bridging nodes using the common source network node identifier, the network traffic from the source network to the receiving network;
filtering a first part of the network traffic by the two content-bridge nodes, prior to forwarding; and
aggregating a second part of the network traffic by the two content-bridge nodes, prior to forwarding.

2. The method according to claim 1, comprising:
exchanging synchronisation information in the source network by the two content-bridge nodes when the network traffic includes sporadic data.

3. The method according to claim 2, wherein the source network is a PRP or a HSR ring, and the receiving network is a PRP or HSR protocol, the method comprising:
forwarding the network traffic according to the protocol of the receiving network.

4. The method according to claim 1, wherein the source network is a PRP or a HSR ring, and the receiving network is a PRP or HSR protocol, the method comprising:
forwarding the network traffic according to the protocol of the receiving network.

5. The method according to claim 1, wherein the network traffic includes periodic and sporadic data.

6. The method according to claim 1, wherein the source network also operates as a receiving network and the receiving network also operates as a source network, the content bridging nodes being instantiated for bidirectional traffic.

7. A network bridge between a source network and a receiving network of a communication network, the network bridge comprising:
two content-bridging nodes configured for connection between the source network and the receiving network according to a redundancy schema defined in IEC 62439-3;
wherein the two content-bridging nodes have a common source network node identifier, each of the two content-bridging nodes being configured to forward network traffic from the source network to the receiving network using the common source network node identifier;
wherein the two content-bridge nodes are configured to:
filter a first part of the network traffic, prior to forwarding; and
aggregate a second part of the network traffic, prior to forwarding.

8. The network bridge according to claim 7, wherein the two content-bridge nodes are configured to:
exchange synchronisation information in the source network when the network traffic includes sporadic data.

9. The network bridge according to claim 8, wherein the source network is a PRP or a HSR ring, and the receiving network is a PRP or HSR protocol, the network bridge being configured to forward the network traffic according to a protocol of the receiving network.

10. A combination according to claim 9, comprising the network bridge with the source network and the receiving network of the communication network.

11. The network bridge according to claim 7, wherein the source network is a PRP or a HSR ring, and the receiving network is a PRP or HSR protocol, the network bridge being configured to forward the network traffic according to a protocol of the receiving network.

12. A combination according to claim 7, comprising the network bridge with the source network and the receiving network of the communication network.

13. The network bridge according to claim 12, wherein the source network is a PRP or a HSR ring, and the receiving network is a PRP or HSR protocol, the network bridge being configured to forward the network traffic according to a protocol of the receiving network.

14. The network bridge according to claim 12, configured to connect two different layers of the source and receiving networks in a transparent manner wherein the source network appears in the receiving network as a logical network node, and the receiving network appears in the source network as a logical network node.

15. The network bridge according to claim 12, wherein the source network also operates as a receiving network and the receiving network also operates as a source network, the content bridging nodes being instantiated for bidirectional traffic.

* * * * *